United States Patent Office 3,111,994
Patented Nov. 26, 1963

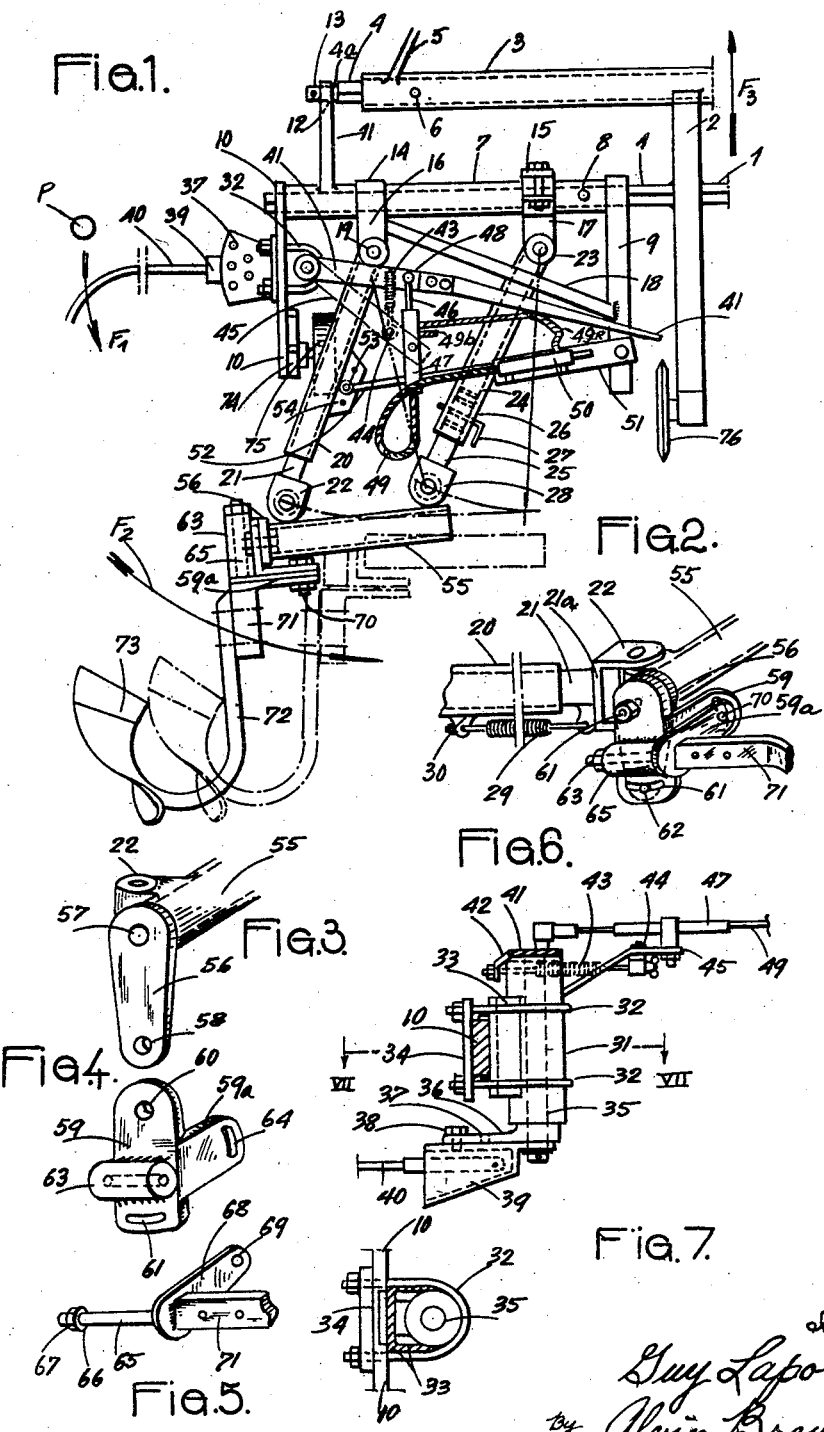

3,111,994
AUTOMATICALLY CONTROLLED LEVELLING
PLOUGH FOR CULTIVATING IN ROWS
Guy Laporte, Artigues de Lussac, Gironde, France
Filed Dec. 20, 1960, Ser. No. 77,231
Claims priority, application France Dec. 21, 1959
4 Claims. (Cl. 172—5)

The present invention has the purpose of facilitating the lateral penetration of ploughshares called "levelling ploughs" as well as disengaging the mould-board by the progressive effecting of the latter when withdrawn from the furrow, this while modifying its angle of attack and exit.

The body of the plough is displaced laterally to the maximum during its passage between two plant roots in line by the play of two telescopic arms whose spacing at their articulated end on the frame forming the drawbar is greater or at least different to the spacing of their other end articulated on the bar holding the toolholder which is fixed to the beam of the plough.

As the length of the telescopic arms is variable, the bar carrying the plough is not parallel to the frame forming the drawbar, and thus the ploughshare modifies its angle of entering and emerging from the earth. The progressive advancing of the mould-board is caused at the same time, which facilitates the sliding of the earth on the mould-board.

According to the invention, an automatically controlled levelling plough for cultivating in rows, comprises a chassis attached to the agricultural tractor, this chassis carrying a frame sliding in relation to the chassis, supports being fixed on the frame, articulations being integral with the supports, telescopic arms being fixed on the articulations, a tool-holder being held on the telescopic arms, at least one plough being fixed on the toolholder, a driving member acting on the telescopic arms for displacing the latter, this driving member being subjected to the action of a lever, this lever being mounted on an articulation controled by a feeler.

Other characteristics of the invention will moreover be revealed by the detailed description which follows.

One form of embodiment of the purpose of the invention is shown, by way of example, in the attached drawing.

FIG. 1 is a plan view of the automatic levelling plough.

FIG. 2 is a perspective view on a larger scale of parts of the plough.

FIGS. 3, 4 and 5 are perspective views of parts of the plough.

FIG. 6 is a side elevation of a member of the machine.

FIG. 7 is a plan view of part of the member of FIG. 6.

In FIG. 1, the square section bar 1 is fixed on the frame member 2 integral with a crossbar 3 formed by a square section tube, engaged in a bar 4 of corresponding section. The crossbar 3 is supported by tie-rods 5, of which only one is shown. These tie-rods are fixed on the agricultural tractor, for example, on the device for lifting the tools.

The crossbar 3 is secured on the bar 4 by screws traversing the tube forming a cross bar and the bar 4. A square section tube 7 is engaged on the bar 1 and bolted on to the latter by a screw 8. Two arms 9, 10 are fixed to the ends of the tube 7; these arms being suitably drilled for the passage of the bar 1. A third arm 11, made integral with the tube 7, is placed in the opposite direction to that of the arms 9, 10 and comprises an opening 12 through which is passed the end 4a of the bar 4. 13 denotes the pin locking the bar 4 on the arm 11. Two collars 14, 15 each carrying a cap 16 or 17 are fixed on the tube 7. Two superimposed bars 18 connect the cap 16 to the arm 9 so as to make the cap rigid.

The cap 16 carries an articulation 19 on which a telescopic arm 20 is mounted whose movable part 21 carries an articulation 22. The cap 17 integral with the collar 15 carries an articulation 23 on which a second telescopic tube 24 is mounted whose sliding part 25 is made integral with the fixed part 26 by a pin 27 traversing openings made both in the movable part 25 as well as in the fixed part 26.

The sliding part 21 of a telescopic tube 20 is connected by a spring 29 to the fixed part of the telescopic tube (FIG. 2). One of the ends of the spring 29 is fixed to a side plate 21a integral with the sliding part, while its other end is fixed on a side plate 30 integral with the fixed part of the telescopic tube 20. A bearing 31 formed by a vertical tube is fixed by means of clamps 32 on to the arm 10 by means of a U-shaped part 33, inserted between the arm 10 and the bearing 31. A counterplate 34 cooperates with the clamps 32 for holding the bearing 31. A shaft 35 is placed in the bearing 31 and carries a sector 36 at its lower end, drilled with holes 37. Screws 38 traversing the holes 37 hold the part 39 carrying a feeler 40. The upper end of the shaft 35 carries a lever 41. This latter is integral with a lateral arm 42 on which one of the ends of a spring 43 is fixed, the other end being integral with a part 44, attached to the end of a bracket 45 integral with the external periphery of bearing 31. The driving member 46 of a hydraulic distributor 47 mounted on the bracket 45 is integral, by means of an articulation 48, with the lever 41. The distributor 47 is connected by flexible tubes 49, 49a to a double-acting jack 50, fixed on a plate 51 connected to the arm 9. The control rod 52 of the double-acting jack 50 terminates in a finger 53 penetrating into holes drilled in a plate 54 integral with the telescopic arm 20. Articulations 22 and 28 carry a strut-tube 55 of which one end is provided with a side plate 56 drilled with two holes 57 and 58. The length of the strut is less than the distance separating the two caps 14, 15 so that the telescopic arms 20, 24 are not parallel. An L-iron 59 drilled at its top part with a hole 60 through which a screw 61 (FIG. 2) passes, screwing into the hole 57 of the side plate 56, is also drilled with a slot 61 through which a screw 62 passes screwing into a tapped hole 58 in the side plate 56. The L-iron 59 carries a journal 63 and is drilled with a second slot 64. A spindle 65 (FIG. 5) is normally engaged in the journal 63 and held in the latter by a washer 66 and nut 67. The spindle 65 carries an arm 68 which presses against the wing 59a of the L-iron 59. A hole 69 drilled in the arm 68 allows a bolt 70 to pass through the slot 64 of the wing 59a of the L-iron 59.

Lastly, the arm 68 holds the tool-holder 71 on to which the beam 72 of the plough 73 is fixed.

It will be noticed in FIG. 1 that the arm 10 carries a strut 74 at its rear part provided at its lower end with a spindle on which a wheel 75 is mounted enabling the earthing of the tools of the plough to be regulated. At the rear end of the frame member 2 there is also a strut and a wheel 76.

The plough hitched on behind the tractor goes forward in the direction of the arrow $F_3$ (FIG. 1).

In FIG. 1, P denotes one of the plants cultivated in line, between which the plough must pass for tilling the soil.

When the feeler 40 comes into contact with one of the plants P, it pivots in the direction of the arrow $F_1$ (FIG. 1), which involves the rotation of the part 39 of the shaft 35 and lever 41 integral with the upper part of the shaft 35. The driving member 46 of the distributor 47 is drawn at the same time that the spring 43 is stretched. The distributor 47 directs the fluid under pressure coming from a unit fixed on the tractor of the plough via input 49b, which immediately causes the double-acting jack 50 to come into action through its control rod 52. The telescopic arms 20 and 24 pivot in the direction of the arrow F₂ and the plough, supported by the tube 55 connecting the two telescopic arms 20 and 24, rapidly assumes the position shown by the dotted line in FIG. 1.

In this position the ploughshare or ploughshares of the plough do not risk coming into contact with the plants P. As soon as the feeler 40 has left the plant under consideration, the spring 43 returns the lever 41 to its first position, which causes the working, in the reverse direction, of the distributor 47 controlling the return to its former position of the double-acting jack 50. The plough then immediately assumes the position shown by the solid lines in FIG. 1.

By regulating the position of the beam 72 of the plough by means of the parts 56, 69, 68 and the toolholder 71, the positions of the ploughshares and mouldboards can be regulated, so that, when the plough is moving in front of a plant P, the members of the plough assume a position facilitating their exit from the earth when returned to the working position, these same members being properly directed for penetrating easily into the ground.

According to the distance separating two rows of plants, the position of the plough can be regulated in the horizontal plane by shifting the bar 4 in relation to the tube 3 and also by shifting the tube 7 in relation to the bar 1. This operation entails the loosening of the screws 6 and 8.

In order to make the description clear, only half of the levelling plough has been shown in the drawings, but generally, second unit identical with that shown in FIG. 1 but symmetrical in relation to the frame member 2 is placed to the right of this frame member. In the event of a breakdown of the unit producing the driving fluid or breakdown of the distributor or jack, a worker can operate the lever 41 by hand for causing effacing and returning the plough to its working position.

I claim:

1. A tractor mounted automatically controlled levelling plough for cultivating in rows, comprising a frame adjustably mounted on the chassis, one support adjustable and another support mounted in a fixed relation on said frame, articulations on said supports, telescopic arms at least one of which is free to continuously telescope fixed on the articulations, means to prevent the uncoupling of said telescopic arms, a tubular element articulated to said telescopic arms, a tool holder fitted onto one extremity of said tubular element, a plough fixed adjustably onto said tool holder, said telescopic arms fitted to said articulations mounted on said supports a certain distance from one another, said tubular element fitted to said telescopic arms at their other extremities on articulations fitted at a cerain distance different from the first mentioned distance, an activating device comprising hydraulic means, a member driven by said hydraulic means and acting on said arms to bring said tubular element from an active working position with said telescopic arms being inclined one in relation to the other to an inactive position with said telescopic arms being inclined in another relation one to the other and to return said tubular element to its active position, said activating device further comprising a pivotally mounted lever for activating said hydraulic means, a feeler connected to said lever, and a resilient member connected to said lever to bias said lever in a position to return said tubular element to its active position after a signal to the feeler which had moved the tubular element to an inactive position has been withdrawn.

2. A tractor mounted automatically controlled levelling plough for cultivating in rows as set forth in claim 1, wherein the articulations on said supports and telescopic arms are at a distance from one another normally greater than the distance between the articulations on said telescopic arms fitted onto said tubular element.

3. A tractor mounted automatically controlled levelling plough for cultivating in rows as set forth in claim 1, comprising means for adjustably mounting a frame onto a chassis, means for adjustably mounting one of said telescopic arms onto said frame and means for adjustably varying the length of this telescopic arm to bring the tool into the working position required for the ground to be ploughed.

4. A tractor mounted automatically controlled levelling plough for cultivating in rows as set forth in claim 1 comprising a tubular element fitted to said telescopic arms, a tool holder fitted to said tubular element and means for adjustably varying the angular position of the tool in relation to the required work.

References Cited in the file of this patent

UNITED STATES PATENTS

| 1,852,407 | Goeke | Apr. 5, 1932 |
| 2,442,095 | Reed et al. | May 25, 1948 |
| 2,608,146 | Lund | Aug. 26, 1952 |

FOREIGN PATENTS

| 443,272 | France | July 10, 1912 |
| 1,207,452 | France | Sept. 7, 1959 |